UNITED STATES PATENT OFFICE.

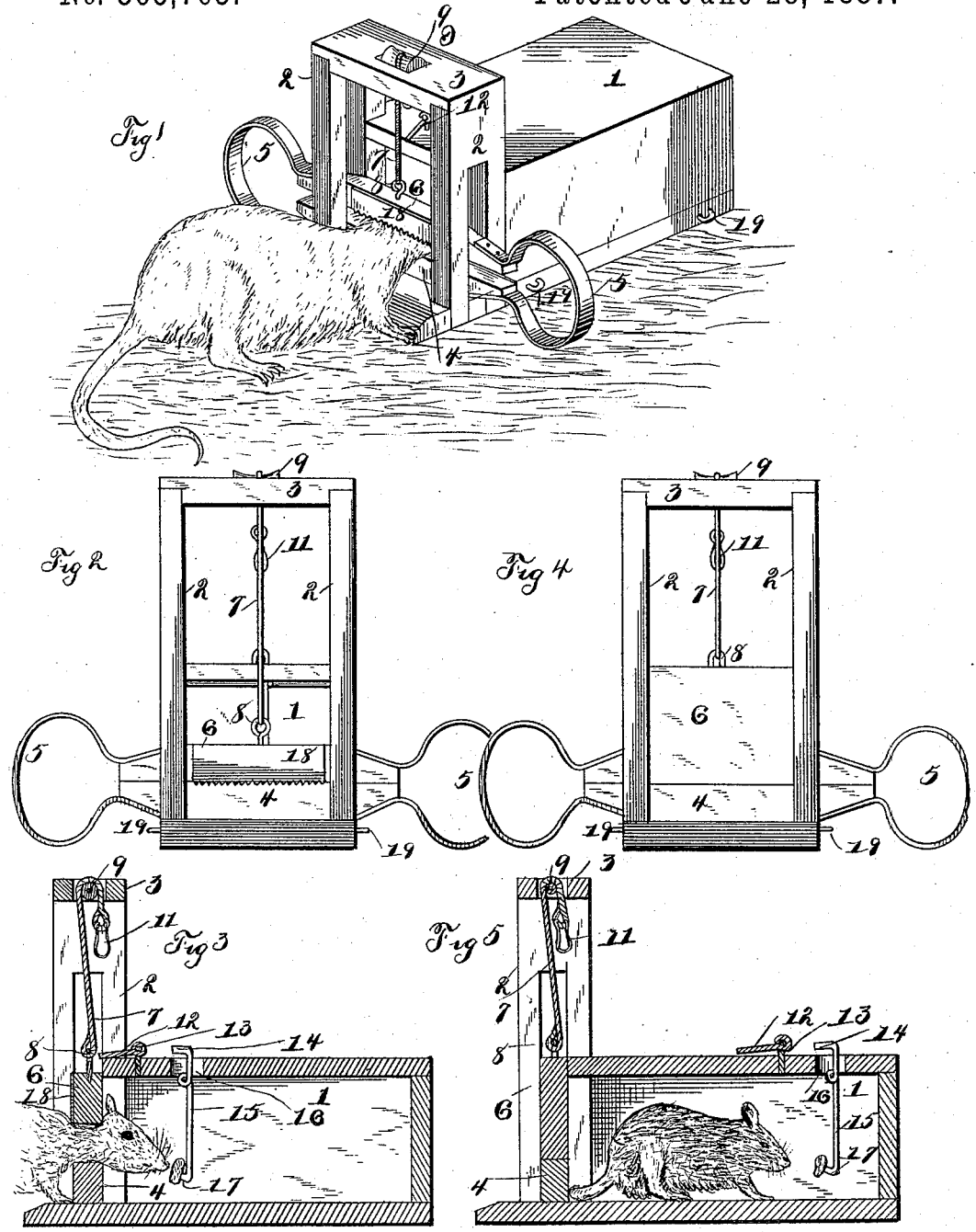

CHARLES RICHARD SWAN, OF BOIS BRULE, MISSOURI, ASSIGNOR OF ONE-THIRD TO ALFRED BISHOP, OF SAME PLACE.

ANIMAL-TRAP.

SPECIFICATION forming part of Letters Patent No. 365,763, dated June 28, 1887.

Application filed May 17, 1887. Serial No. 238,516. (No model.)

*To all whom it may concern:*

Be it known that I, CHARLES RICHARD SWAN, a citizen of the United States, and a resident of Bois Brule, in the county of Perry and State of Missouri, have invented certain new and useful Improvements in Traps; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved trap, showing the form for catching the animals and killing them. Fig. 2 is a front view of the same. Fig. 3 is a longitudinal vertical sectional view of the said form of the trap. Fig. 4 is a front view of the form of trap for catching the animals alive, and Fig. 5 is a vertical longitudinal sectional view of the same.

Similar numerals of reference indicate corresponding parts in all the figures.

My invention has relation to that class of traps for catching various animals in which the bait is secured to a trigger within a box, the said trigger securing the end of a pivoted arm which holds the springing jaw of the trap; and it consists in the improved construction and combination of parts of such a trap, as hereinafter more fully described and claimed.

In the accompanying drawings, the numeral 1 indicates a box having one end open if only a single trap is desired, while it is constructed with two open ends and a central partition if a double trap is desired.

At the sides of the open end of the trap are secured two vertically and transversely slotted uprights, 2, united at their upper ends by a cross-piece, 3, and a transverse sill or lower jaw, 4, is secured across the opening in the lower ends of the slots of the uprights. The lower inwardly-curved ends of two flat springs, 5, are secured to the ends of this lower jaw, and the upper inwardly-bent ends of the springs are secured to the ends of the upper jaw, 6, sliding with its ends in the slots of the uprights, the springs being bent to form loops, the ends of which have a tendency to close toward each other, so that the force of the springs will draw the upper jaw down toward the lower jaw. A cord, 7, is secured to an eye, 8, upon the middle of the upper edge of the upper jaw, and this cord passes over a pulley, 9, in the top piece connecting the uprights, having a long eye, 11, at its other free end.

An arm, 12, is pivoted at one eyed end to an eye, 13, upon the upper side of the box, and this arm may engage the eye and have it slipped in upon it, whereupon the outer free end of the arm may be held by the outwardly-bent upper end, 14, of the trigger 15, which is pivoted in a slot, 16, in the top of the box, with its hooked or bent end projecting up through the slot, and having bait secured to the lower hooked end, 17.

It will thus be seen that when the trap is baited, the bait being secured upon the lower hooked end of the trigger, and the upper jaw has been raised and is held by the eye being engaged by the arm, which again is held by the bent end of the trigger, any attempt to remove the bait from the hook will pull the trigger sufficiently to disengage it from the end of the arm and to allow the eyed end of the cord to slip off from the freed arm, allowing the upper jaw to slide down by the force of the springs.

When the trigger is close to the opening of the box and the upper jaw, or possibly both jaws, are provided with toothed or serrated gripping-plates 18, having the teeth or serrations projecting below the edge of the jaw, and the springs are of considerable strength, the animal touching the bait will be caught around the neck or fore part of the body, the gripping-plates holding and cutting the animal, when it will be killed or dangerously injured; but if the springs are weaker comparatively, and the upper jaw is smooth and covers the entire opening when released, forming a door rather than a jaw, and the trigger is of a sufficient distance from the opening to admit of the entire animal entering the box, the animal will not be killed, but will be caught alive and uninjured.

The trap may be used for all sizes of animals, being made of a suitable size for the animals intended to be caught in it, and it may be used on land as well as in the water or on the water, and if larger animals are to be caught in it, it may be secured to firm objects by means of cords or chains attached to staples 19 upon the box.

Having thus described my invention, I claim and desire to secure by Letters Patent of the United States—

1. In a trap, the combination of a box having two vertically and transversely slotted uprights secured at the sides of its open end, and having a lower jaw or sill secured with its ends in the lower ends of the slots, loop-shaped springs secured with their lower ends to the ends of the lower jaw, an upper jaw having its ends secured to the upper inwardly-bent ends of the springs, a trigger having a bait-hook at its lower end and pivoted near its upper hooked end in a slot in the top of the box, an arm pivoted to an eye upon the top of the box and having its free end engaged by the upper hooked end of the trigger, and a cord secured to the upper jaw and passing over a pulley in the top piece connecting the uprights, having an eye at its free end engaged by the arm, as and for the purpose shown and set forth.

2. In a trap, the combination of a box having two vertically-slotted uprights secured at its open end and connected by a cross-piece at the upper ends, a lower jaw secured in the lower ends of the slots, loop-shaped springs secured with their inwardly-bent lower ends to the ends of the lower jaw, an upper jaw having a serrated gripping-plate upon its outer side and sliding with its ends in the slots, having the upper inwardly-bent ends of the springs secured to its ends, an arm pivoted with its eyed end to an eye upon the top of the box, a trigger having a hooked lower bait end and having a bent upper end and pivoted in a slot in the top of the box near its upper end, and a cord secured to the upper jaw and passing over a pulley in the cross-piece, and having an eye at its other end engaging the arm and being held upon the same by the bent end of the trigger engaging the end of the arm, as and for the purpose shown and set forth.

In testimony that I claim the foregoing as my own I have hereunto affixed my signature in presence of two witnesses.

CHARLES RICHARD SWAN.

Witnesses:
J. E. CALLIER,
A. M. BISHOP.